United States Patent [19]

Ahner et al.

[11] Patent Number: 4,819,436
[45] Date of Patent: Apr. 11, 1989

[54] DEAERATOR PRESSURE CONTROL SYSTEM

[75] Inventors: David J. Ahner, Ballston; Philippe J. Dupin, Scotia, both of N.Y.

[73] Assignee: General Electric Company, Schenectady, N.Y.

[21] Appl. No.: 199,227

[22] Filed: May 26, 1988

[51] Int. Cl.$^4$ .................... F01K 13/02; F01K 7/34
[52] U.S. Cl. ................................ 60/657; 60/660; 60/677; 60/678
[58] Field of Search ............... 60/646, 657, 660, 677, 60/678

[56] References Cited

U.S. PATENT DOCUMENTS

| | | | |
|---|---|---|---|
| 3,300,974 | 1/1967 | Reed et al. | 60/677 |
| 4,099,384 | 7/1978 | Stevens et al. | 60/657 |
| 4,345,438 | 8/1982 | Labbe et al. | 60/657 |
| 4,402,183 | 9/1983 | Dimitroff et al. | 60/660 |
| 4,474,012 | 10/1984 | Chamberlain | 60/660 |

Primary Examiner—Allen M. Ostrager
Attorney, Agent, or Firm—Jerome C. Squillaro

[57] ABSTRACT

In a steam turbine power plant, a deaerator is heated and pressurized by extraction steam from the steam turbine for the purpose of preheating feedwater to the power plant boiler. Under certain conditions, the available steam to the deaerator is insufficient to adequately maintain pressure in the deaerator leading to steam voids with a rapid rise in deaerator water level which could cause damage to the deaerator, feedwater pumps or the turbine and lead to a power plant shutdown. A second source of steam is available to provide steam under these conditions and a control system for controlling the steam input into the deaerator is shown. Under conditions of falling pressure, if a certain rate is exceeded, the second source of steam is input into the deaerator to maintain adequate pressure for stable operation.

11 Claims, 2 Drawing Sheets

DEAERATOR PRESSURE CONTROL SYSTEM

This invention relates, in generally, to control systems for steam turbine power plants; and, in particular, this invention relates to a deaerator pressure control system for preventing the flooding of a deaerator under conditions of decreasing load or increasing process steam demand.

BACKGROUND OF THE INVENTION

In a steam turbine power plant, a boiler heats feedwater into steam which is then introduced into the steam turbine to turn a bladed rotor and thus produce a power output. The power output could be used to drive another mechanical device or it could be used to drive an electrical generator to produce electrical energy. The steam within the steam turbine may be extracted for preheating feedwater and it may also be used for providing process steam to a steam consuming process. The remainder of the steam is exhausted to a steam Condenser where it becomes feedwater again to be recirculated to the boiler. Makeup water may also be added to the feedwater as the feedwater level is diminished.

Prior to being introduced into the boiler, the feedwater may be preheated by a number of devices. One such device, a generic feedwater heater, provides non-contact heating of the turbine feedwater by passing a plurality of water filled tubes through a steam filled container whereby heat from the steam is used to heat the feedwater. Another water heating device is a deaerator which utilizes steam extracted from a steam turbine to preheat feedwater which is sprayed into the steam chamber of the deaerator. The deaerator is a direct contact feedwater heater which heats feedwater and removes non-condensible gases. The deaerator is pressurized by steam extracted from the steam turbine and it is important to avoid rapid depressurization in the deaerator in order to control the volume swell of water held within the deaerator while the water is being heated. If rapid depressurization happens, flooding could occur causing water slugs in the steam inlet line or damaging deaerator trays which may necessitate plant shutdown.

The deaerator contains a hot well from which feedwater is pumped to the boiler by a boiler feed pump. The rate of pressure decay in the hot well must not exceed a value which would cause flooding and there is a minimum pressure which must maintained to avoid cavitation at the boiler feed pump suction. This minimum pressure is sometimes referred to as the net positive suction head. The net positive suction head (NPSH) is the energy required to fill a pump on the suction side and overcome friction and flow losses from the suction connection to that point in the pump at which more energy is added.

Normally, pressure is maintained in the deaerator by means of uncontrolled extraction steam from the steam turbine. However, the pressure at which this steam is supplied is subject to fluctuations that occur upon changes in process steam demand or power plant demand. These fluctuations are directly reflected in deaeration pressure and must be controlled to avoid the previously mentioned problems.

One prior art solution to the problem is to assure a second source of steam pressure to the deaerator which is utilized when steam pressure falls below a predetermined minimum pressure. Such a source of steam could be a process steam line which is tapped through a control valve to add steam whenever the steam pressure of the deaerator falls below the predetermined minimum pressure. However, the rapid decrease in the supply of steam to the deaerator and consequent rapid depressurization of the deaerator could result in severe misoperation before the minimum pressure point and the corrective action that would trigger from a second steam source.

U.S. Pat. No. 4,345,438 to Labbe et al and assigned to the assignee of the present invention is relevant in that it provides a controller for avoiding deaerator flooding due to rapid depressurization caused by operating transients. The solution in that patent is to reduce the inflow of feedwater into the deaerator in response to a signal indicative of turbine load.

It is an object of the present invention to provide a system for avoiding flooding in a deaerator by controlling the pressure in the deaerator.

It is another object of the invention to provide a system for avoiding flooding in a deaerator even before a critical low pressure in the deaerator is reached.

It is another object of the invention to provide a system which will assure adequate pressure for avoiding upset in the boiler feedwater pump.

The novel features believed characteristic of the present invention are set forth in the appended claims. The invention itself, however, together with further objects and advantages thereof may best be understood with reference to the following description and drawings.

SUMMARY OF THE INVENTION

The present invention is implemented in a steam turbine power plant wherein the turbine includes at least one steam extraction line connected between the steam turbine and the deaerator for the purpose of pressurizing the deaerator. In accordance with the foregoing description the available steam and/or pressure in the steam extraction line may be variable; and, in the case of a rapidly decreasing availability of steam and/or steam pressure rapid depressurization could occur in the deaerator causing level swells of the water in the deaerator and cavitation of the boiler feedpumps. A second source of steam is used to supplement the extraction line steam under the control of a valve controller in accordance with the present invention. The valve controller sends a valve position signal to an automatic valve connected into a second steam line and its operation is governed by sensed pressure in the steam extraction line. Under conditions where the rate of steam pressure drop exceeds a preselected limit, a valve opening signal will be sent to the second steam line valve. The valve setpoint pressure tracks the changes in the extraction pressure with a preset lag in the pressure decrease direction. Anytime the steam extraction line pressure climbs above the setpoint pressure, a valve closing signal will be sent to the valve. A floor pressure or minimum pressure is set at a level which is sufficient to avoid cavitation in a boiler feedwater pump.

DETAILED DESCRIPTION OF THE INVENTION

Figure 1:
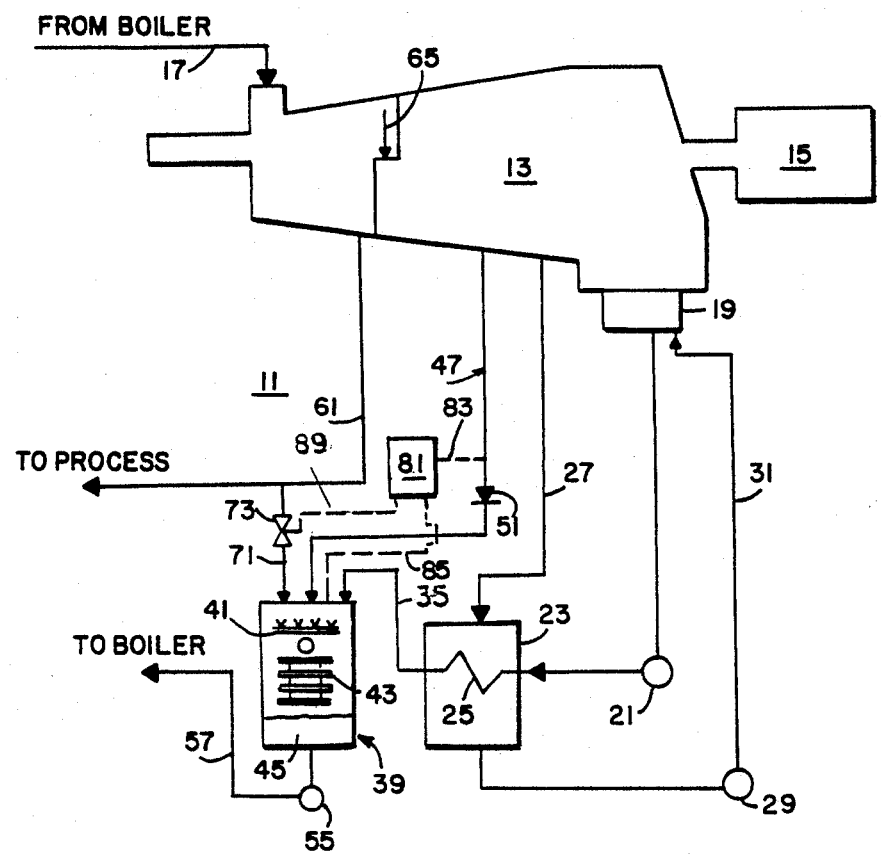
FIG. 1 is a schematic drawing of a steam turbine power plant showing implementation of a system for regulating deaerator pressure in accordance with the present invention.

Referring to FIG. 1, a steam turbine power plant 11 includes a steam turbine 13 which is connected to deliver rotational power output to a load 15. In most cases this load will be an electrical generator. Steam from a boiler (not shown) is delivered on input steam line 17 into the steam turbine. After steam has passed through the steam turbine it is converted to water in a condenser 19. Condensate from the steam turbine is then recirculated back to the boiler in the following path. Condensate pump 21 pumps steam into a first feedwater heater 23 which may be a non-contact feedwater heater. In a non-contact feedwater heater, feedwater is sent through the heater in a plurality of pipes (represented by pipe 25) which are bathed in steam input into the feedwater heater line 27 which extracts steam from the steam turbine. The steam, then turned to water, is pumped back to the condenser 19 by means of pump 29 through line 31. The heated feedwater continues on through line 35 into the deaerator 39.

The deaerator is a direct contact water heater which functions to provide direct contact heating of feedwater while also promoting the removal of non-condensible gases from the feedwater Feedwater is input into the deaerator through spraybars 41 where it is mixed with steam and then allowed to flow by gravity over trays 43 into hot well located in the lower portion of the deaerator. The trays delay the flow of water into the hot well so that the heat transfer between the water and the steam is maximized. Steam is supplied into the deaerator through steam extraction line 47. A one way non-return valve 51 is contained within the steam extraction line to prevent reverse flow in the line from the deaerator into the steam turbine.

Heated water is then pumped from the deaerator hot well by a boiler feedwater pump 55 to the boiler through line 57. A high pressure steam line 61 is used to provide steam to process. In this case, the high pressure steam line is connected to an extraction point at a higher pressure point in the steam turbine then either the steam extraction line 47 or the feedwater heater extraction line 27. The flow of steam into the high pressure steam line is controlled by valve 65 within the steam turbine. As the process steam requirements may increase under a constant input of steam, the valve 65 is moved to a more closed position to provide more steam to the process steam line. This is one way in which the flow of steam to the steam extraction line may be decreased causing a decrease in the available steam pressure to the deaerator. Also, if the power demand on the system is decreased, less steam may be produced in the boiler whereas the process steam requirement may remain constant therefore causing less steam to be available at the extraction steam line and thereby causing a drop in the steam pressure available to the deaerator.

In accordance with the present invention, a steam tap or steam line 71 is used to connect a second steam line, in this case the process steam line with the deaerator. This line could be from any steam source with sufficient steam pressure and supply quantity to satisfy deaerator needs. An automatic valve 73 is used to control the amount of steam flow into the deaerator in accordance with the present invention as will be described further. In the broadest sense it can be said that the second steam line 61 is connected to the deaerator through automatic valve 73 to provide additional steam to the deaerator under conditions of insufficient steam availability in the extraction steam line. Also, it should be remembered that the steam in line 61 is at a higher pressure than the steam in the extraction steam line 47.

Figure 2:
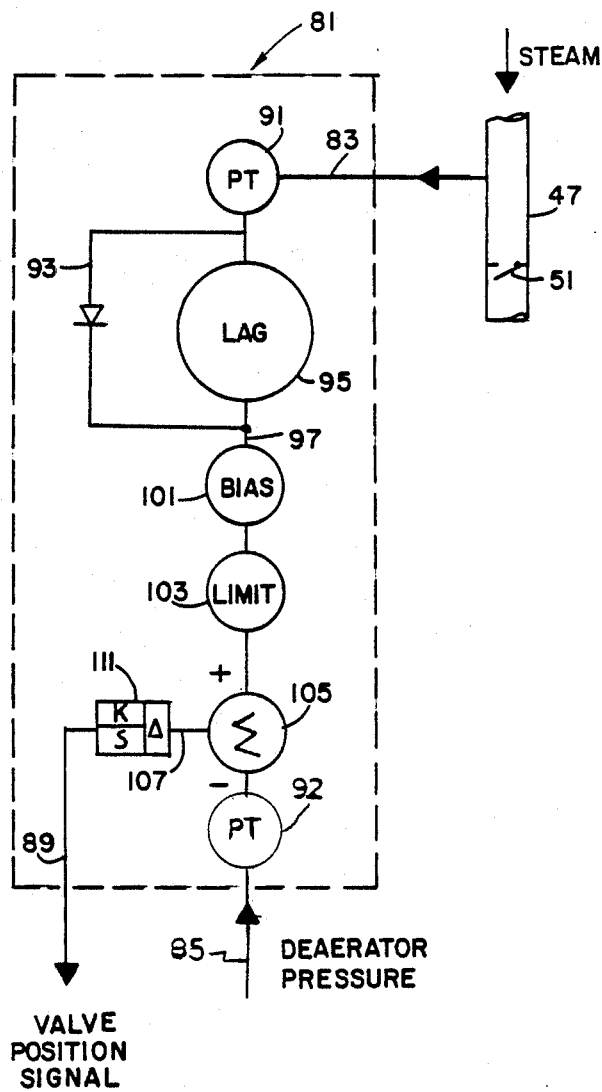
FIG. 2 is a schematic drawing of the valve controller in accordance with the present invention.

The position of the automatic valve (in the sense of steam flow, open or closed) is controlled by a valve controller 81 to be further described in conjunction with FIG. 2. inputs and outputs include an extraction line pressure signal 83, a deaerator pressure signal 85 and a valve position signal 89. It is also important to note that the steam pressure signal for the extraction steam line is taken upstream of the non-return Valve 51 so that sensed pressure is that of available steam in the steam turbine side of the steam extraction line and not deaerator pressure which may be transmitted back to the non-return valve.

Referring now primarily to FIG. 2, and sometimes taken in conjunction with FIG. 1 wherein like numbers are used for identification of like elements, a system for regulating deaerator pressure comprises the valve controller 81 which outputs the valve position signal 89 to the automatic valve 73 which controls the flow of steam through the second steam line to the deaerator. The output valve position signal 89 is based upon the steam extraction line pressure signal 83 and the deaerator pressure signal 85 from the deaerator.

A pressure transducer 91 converts the extraction pressure signal 83 to a control signal proportional to pressure in the steam extraction line. The pressure signal may then follow one of two alternate paths. If the pressure is rising, it will follow a bypass path 93 whereby the valve controller output will instantaneously follow the rising pressure input which will, in turn, cause the valve position signal to call for a valve closing signal. Allowing the pressure set point to instaneously follow in the pressure increasing direction does not cause the previously described problems since there is no steam flashing and in fact it has a stabilizing effect which collapses any existing steam voids in the liquid storage, This feature also provides for the device to instantaneously protect the deaerator and feedpump should there be a depressurizing reversal in the extraction pressure.

On the other hand, if the pressure signal indicates a falling pressure signal, then it will pass through a lag device 95. The lag device may be an adjustable one-way analog device which provides a controlled output change, in the form of a valve open signal, in response to a decreasing pressure signal if the decreasing pressure signal exceeds a predetermined rate set in the lag device 95. The acceptable rate of decreasing pressure is set to a number which will not result in any deaerator flooding. Therefore, the lag device results in an output signal which recognizes the pressure decrease signal and the rate of pressure decrease. One example of such a suitable lag unit is a Foxboro Model 136L available from Foxboro Controls Company of Foxboro, Mass.

The output 97 of the lag device 95 or the bypass path 93 constitutes a modified signal based upon pressure. That signal is input into a biasing network 101 which biases the signal so that positive closure of the automatic valve 73 is achieved. This prevents cycling of the valve due to borderline signals which may call for automatic valve opening and in effect is equivalent to a deadband relative to valve 73.

Limit circuitry 103 provides an absolute floor or minimum below which the valve 73 must open to increase pressure in the deaerator. This absolute floor pressure is based upon the boiler feedwater pump and its net positive suction head (NPSH) requirements at low loads where the extraction pressure is insufficient to maintain the required NPSH. Briefly, the net positive suction head is the required pressure to fill a pump on the suction side and overcome losses from the suction connection to that point in the pump at which energy is added.

Thus the conditioned pressure signal output from limit circuit 103 becomes a setpoint pressure signal which is input into summer circuit 105. A second input into summer circuit 105 is the output of pressure transducer 92 which converts deaerator pressure 85 to the appropriate control signal. The difference of these signals is an output error signal on line 107 into a proportional plus integral controller 111. The proportional plus integral controller 111 converts the valve position change signal on line 107 to a valve position signal on line 89. Such devices are common in the art and their selection is predicated on the requirements of the automatic control valve and other general factors such as whether the control system is electronic, hydraulic or pneumatic.

The operation of the invention is as follows. Under normal design conditions, a steam turbine extraction line will provide adequate steam to the deaerator to deaerate feedwater in the deaerator. However, if the extraction line pressure should fall rapidly; i.e., at a rate which exceeds the rate value set into the lag device of the valve controller, then the lag device will output a valve open signal to the automatic valve which controls the input of a second source of steam into the deaerator. The valve open signal is then dependent upon the magnitude of the rate of pressure drop. The advantage believed inherent in this design is that it utilizes the knowledge that the falling rate of pressure can have a deleterious effect on deaerator operation even before an absolute low pressure is reached. Conversely, the invention recognizes that deaerator pressure may be dropped slowly to a value which is lower than previously thought without causing an upset in the operation of the deaerator. For example, the absolute low pressure limit of the present invention is based upon the cavitation pressure of the boiler feedwater pump rather than a deaerator flooding condition criteria.

While there has been shown what is considered to be the preferred embodiment of the present invention, other modifications may occur to those of skill in the art. It is intended to cover all such modifications which fall within the true spirit and scope of the appended claims.

What is claimed is:

1. In a steam turbine power plant including a steam turbine and having a steam extraction line connected to a deaerator for providing steam to the deaerator; and, a second steam line connected to provide additional steam to the deaerator during periods of insufficient steam from the steam extraction line; a system for regulating deaerator pressure comprising:
   a valve for regulating the flow of steam from the second steam line into the deaerator;
   a valve controller for operating the valve to provide a variable valve position signal which tracks the availability of steam to the deaerator in the steam extraction line in accordance with the rate of decrease of pressure in the extraction steam line.

2. The system for regulating deaerator pressure recited in claim 1 wherein the valve controller includes:
   means for sensing the steam pressure in the steam extraction line;
   means providing a valve closing signal in response to rising pressure in the steam pressure extraction line;
   means providing a valve opening signal based upon the rate of falling pressure in the steam extraction line; and,
   means providing a valve opening signal based upon a floor value of pressure in the steam pressure extraction line.

3. The system for regulating deaerator pressure recited in claim 2 wherein the means for providing a valve opening signal based upon the rate of falling pressure includes an adjustable lag device.

4. The system for regulating deaerator pressure recited in claim 2 wherein the means for providing a valve opening signal based upon a floor value of extraction pressure includes a signal limit device.

5. The system for regulating the deaerator pressure recited in claim 2 wherein the valve controller includes a biasing means.

6. The system for regulating the deaerator pressure recited in claim 2 wherein the valve controller further includes a summing junction for receiving a valve directional signal in the sense of valve open or valve close; and, a deaerator pressure signal also input into the summing junction whereby the output of the summing junction is a valve position change signal.

7. In a steam turbine power plant including a steam turbine and a deaerator, the steam turbine having a steam extraction line connected to the deaerator for pressurizing the deaerator; and, a second steam line for providing steam to the deaerator during periods when there is insufficient steam in the steam extraction line for meeting the deaerator steam pressure requirements; a system for regulating deaerator pressure comprising:
   a valve for regulating the steam flow from the second steam line into the deaerator;
   a controller for providing a valve control signal to the valve, the controller including means for sensing steam pressure in the steam extraction line and providing a valve opening signal whenever the rate of decreasing steam pressure in the steam extraction line exceeds a predetermined rate or a predetermined floor value.

8. The controller recited in claim 7 for providing a valve closing signal which tracks a rising steam pressure in the steam extraction line.

9. In a steam turbine power plant having a steam turbine and a deaerator connected by a steam extraction line; and, a second steam line connected to the deaerator including a valve for controlling steam flow through the second steam line into the deaerator; a controller for providing a valve position signal to the valve comprising:
   a first pressure transducer connected to the steam extraction line for providing a steam pressure signal;
   a second pressure transducer connected to the deaerator for providing a deaerator pressure signal;
   signal lag means for providing a valve opening signal in response to a falling pressure signal which exceeds a predetermined rate;
   signal bypass means for providing a valve close signal in response to a rising pressure signal;
   signal bias means for providing a deadband about critical valve opening and closing values;

signal limit means for providing a minimum pressure value for opening the valve;

summing means receiving the valve opening and closing signals and the deaerator pressure signal to provide an error signal; and, signal amplifying and integrating means to provide a new valve position signal.

10. A device for controlling the flow of steam into a deaerator from a secondary steam source in response to available steam to the deaerator from a primary steam source comprising:

means for determining a falling steam pressure signal in the primary steam source which exceeds a predetermined rate and for providing a valve open signal in response thereto;

means for determining a minimum steam pressure in the primary steam source and providing a valve open signal in response thereto; and, means for maintaining a rising pressure signal above the minimum steam pressure and providing a valve closing signal in response thereto.

11. In a steam turbine power plant including a steam turbine and a deaerator; the steam turbine having a high pressure section and a low pressure section; an extraction steam line connecting the low pressure section and the deaerator and a second steam line connecting the high pressure section and the deaerator; valve means for controlling the steam flow in the second steam line; and, control means for providing a valve position signal to the valve in response to steam pressure in the steam extraction line wherein the control means comprises means for providing a valve open signal in response to a pressure decrease exceeding a predetermined rate; means for providing a valve open signal in response to a pressure which falls below a preset minimum; and, means for providing a valve close signal for a pressure rise above the preset minimum.

* * * * *